US007890938B2

(12) United States Patent
Jensen et al.

(10) Patent No.: US 7,890,938 B2

(45) Date of Patent: Feb. 15, 2011

(54) HETEROGENEOUS NORMALIZATION OF DATA CHARACTERISTICS

(75) Inventors: Nathan Blaine Jensen, Spanish Fork, UT (US); Stephen R Carter, Spanish Fork, UT (US); William Street, Orem, UT (US); Michel Shane Simpson, American Fork, UT (US); William D. Peterson, Provo, UT (US); Scott Alan Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 1332 days.

(21) Appl. No.: 10/375,538

(22) Filed: Feb. 26, 2003

(65) Prior Publication Data

US 2004/0168158 A1 Aug. 26, 2004

(51) Int. Cl.
*G06F 9/45* (2006.01)
*G06F 9/44* (2006.01)
*G06F 15/16* (2006.01)

(52) U.S. Cl. ....................... 717/143; 717/100; 717/112; 709/246

(58) Field of Classification Search ....................... None
See application file for complete search history.

(56) References Cited

U.S. PATENT DOCUMENTS 4,851,999 A 7/1989 Moriyama
5,708,812 A * 1/1998 Van Dyke et al. ........... 717/171
5,778,375 A 7/1998 Hecht ......................... 707/101
5,781,896 A 7/1998 Dalal ........................... 707/2
5,806,066 A * 9/1998 Golshani et al. ............ 707/100
6,016,394 A * 1/2000 Walker ....................... 717/104
6,055,370 A 4/2000 Brown et al.
6,343,265 B1 * 1/2002 Glebov et al. ................. 703/25

(Continued)

OTHER PUBLICATIONS

"Location normalization for information extraction", Li et al., Aug. 2002, pp. 1-7, <http://delivery.acm.org/10.1145/1080000/1072355/p1274-li-1.pdf>.*
"Polynomial-time normalizers for permutation groups with restricted composition factors", Luks et al., Jul. 2002, pp. 176-183, <http://delivery.acm.org/10.1145/790000/780529/p176-luks.pdf>.*
"Multi-language machine translation through interactive document normalization", A. Max, Apr. 2003, pp. 25-32, <http://delivery.acm.org/10.1145/1610000/1609826/p25-max.pdf>.*
Britton, Chris , "IT Architectures and Middleware, Strategies for Building Large, Integrated Systems", Chapter 12, (Apr. 2001),9 pgs.
Linthicum, David S., "B2B Application Integration, e-Business-Enable Your Enterprise", Chapter Two, (Aug. 2001),19 pgs.

*Primary Examiner*—Thuy Dao
(74) *Attorney, Agent, or Firm*—Schwegman, Lundberg & Woessner, P.A.

(57) ABSTRACT

Methods, systems, and data structures are provided for normalizing data characteristics between applications. A first application is associated with a first data characteristic, and a second application is associated with a second data characteristic. A most-restrictive or common data characteristic is determined from the first and second data characteristics. The most restrictive or common data characteristic is enforced on access attempts to the first or second applications.

9 Claims, 3 Drawing Sheets

U.S. PATENT DOCUMENTS 6,411,974 B1 * 6/2002 Graham et al. .............. 715/531
6,484,177 B1 * 11/2002 Van Huben et al. ........... 707/10
7,681,186 B2 * 3/2010 Chang et al. ................ 717/143
2002/0144246 A1 * 10/2002 Yu ............................ 717/143
2003/0033535 A1 * 2/2003 Fisher et al. ................ 713/185
2003/0088543 A1 * 5/2003 Skeen et al. ................... 707/1
2003/0172368 A1 * 9/2003 Alumbaugh et al. ........ 717/106
2004/0037230 A1 * 2/2004 Kroboth et al. ............. 370/252
2004/0044793 A1 * 3/2004 Pauly et al. ................. 709/246
2004/0123304 A1 * 6/2004 Black et al. ................. 719/318

* cited by examiner

HETEROGENEOUS NORMALIZATION OF DATA CHARACTERISTICS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2003, Novell, Inc., All Rights Reserved.

FIELD OF THE INVENTION

The present invention relates to data normalization and in particular to normalization of disparate data characteristics associated with heterogeneous applications.

BACKGROUND OF THE INVENTION

Administering a plurality of heterogeneous applications or systems in a networked environment is a challenging task that consumes a large amount of organizational resources. However, organizations continue to require the existence and use of heterogeneous applications for a variety of reasons, such as requirements of existing clients, legacy applications, functionality required by the organization, and the like. Therefore, organizations are forced to develop ad hoc techniques to assist in better and more efficient management of heterogeneous applications. In addition, many times organizations desire interoperability between the heterogeneous applications in order to more fully integrate the applications with one another for productivity improvements Generally, organizations that manage heterogeneous applications will develop expertise with one employee for a particular application and expertise with a different employee for another application. This creates duplicate personnel to manage applications, which is necessary because the applications have different data characteristics (e.g., policies, validation techniques, data types, data values, data ranges, data lengths, and the like). These different data characteristics may require that multiple policies be established to accommodate the varying data characteristics for the heterogeneous applications being supported by the organization.

For example, one application may require a password having a minimum data length of 6 characters, while another application may require a password having a minimum data length of 8 characters. This situation requires the organization to be able to administer two different password policies with respect to these applications. In some instances, the disparate policies can be more complex and thus require multiple network administrators.

Moreover, the disparate data characteristics can inhibit the interoperability of two heterogeneous applications, since if the two applications are communicating with one another the data characteristics of a first application may not conform to or be properly translated by a second application. Thus, to effectively interface the two applications, the second application needs to handle the data characteristics of the first application.

Conventional techniques to alleviate these problems have focused on creating mapping algorithms, which generally translate data between two heterogeneous applications but do not alter or normalize the data characteristics handled by two heterogeneous applications. While these techniques may be useful for importing and exporting disparate data, they do not permit two applications to effectively communicate with one another, and they do not create single policies that can be used to administer both heterogeneous applications. In fact, these techniques create yet another policy to administer, which is the new mapping algorithm, in addition to the two heterogeneous applications. Further, despite the importing of disparate data, the requirements of the application requiring a longer password from a system utilizing only smaller passwords can only be accomplished by either subverting the policy of the first system or mangling the data from the second system to create the mapping in a deterministic manner.

As is now apparent to one of ordinary skill in the art, there exists a need for improved techniques that can normalize data characteristics for heterogeneous applications. This need is particularly desirable for large networks having a plurality of heterogeneous applications and policies. Furthermore, the techniques should be capable of federating the normalized data characteristics across heterogeneous applications, such that a single network policy can be implemented, maintained, and supported for the heterogeneous applications.

SUMMARY OF THE INVENTION

In various embodiments of the present invention, techniques normalizing data characteristics for heterogeneous applications/systems are presented. By selecting a data characteristic that is usable by both heterogeneous applications and enforcing that common data characteristic against applications, administration and interoperability of both applications can be improved.

More specifically and in one embodiment of the present invention, a method to normalize data characteristics between applications is provided. A first application having a first data characteristic and a second application having second data characteristic are identified. Next, a common data characteristic is determined from the first data characteristic and the second data characteristic. Finally, a policy for accessing the first and second applications is determined. The policy is used to enforce the common data characteristic for both the first and second applications.

In another embodiment of the present invention, another method to normalize data characteristics between applications is described. A first data characteristic and a second data characteristic associated with a first application and a second application, respectively, are received. A common data characteristic for the first and second data characteristics is selected. The common data characteristic is enforced when the first and second applications are accessed.

In still another embodiment of the present invention, a system to normalize data characteristics between applications is presented. The system includes a network, a first application having a first data characteristic, a second application having a second data characteristic, a normalization application, and a schema application. The normalization application selects one of the first and second data characteristics as a common data characteristic. The schema application enforces a schema representing the common data characteristic for both the first and second applications over the network.

In yet another embodiment of the present invention, a meta schema for normalizing data characteristics between applications is taught. The meta schema resides in a computer readable medium and includes a first identification for a first application, a second identification for a second application, and rules data. The rules data defines a common data characteristic for access to the first and second application. The meta schema is invoked when access is attempted to the first or second application and the rules data is applied before access is granted.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
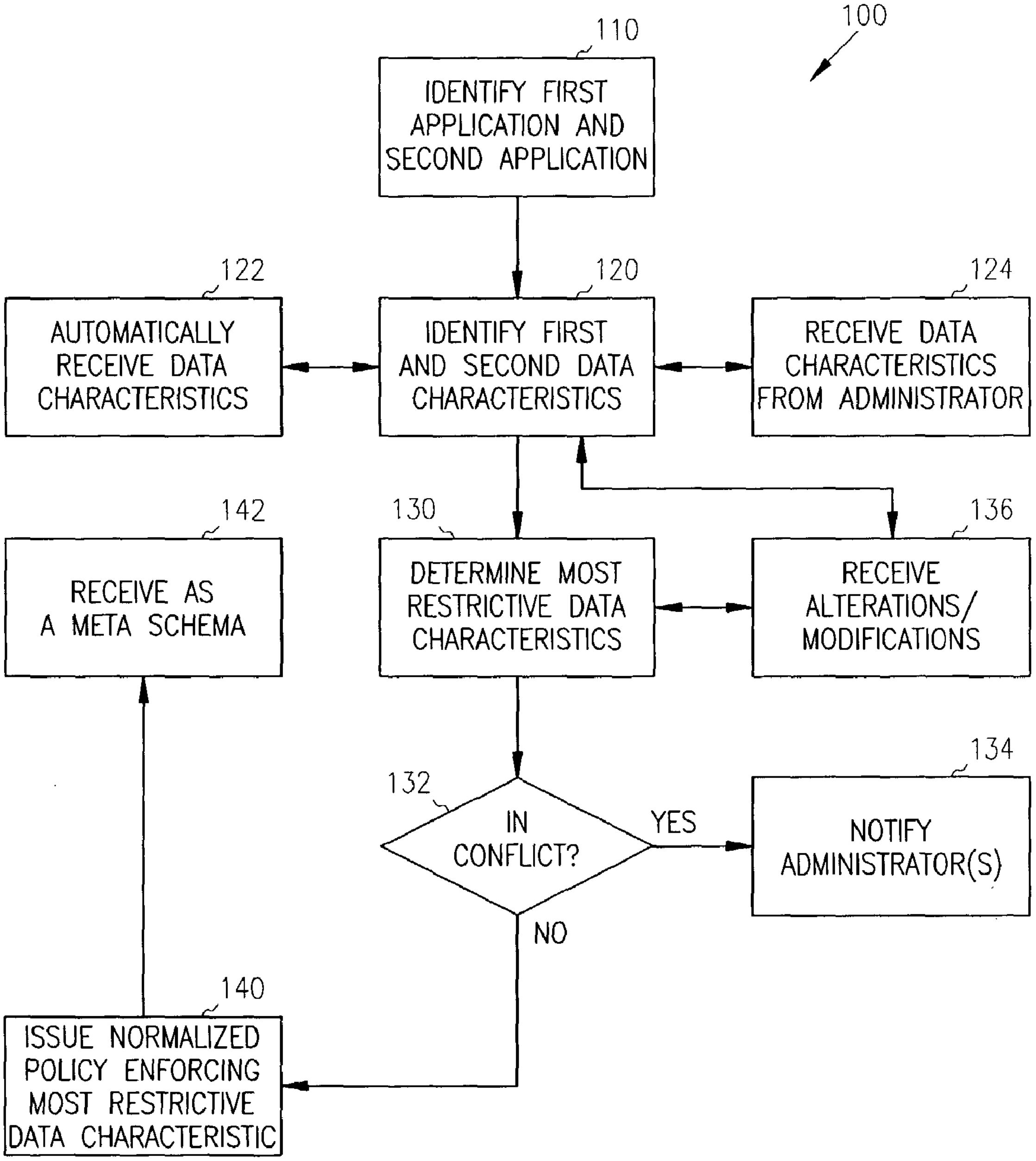
FIG. 1 is a flowchart representing a method to normalize data characteristics between applications, according to one embodiment of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, the phrase "data characteristic" is used. Data Characteristic includes, by way of example only, attributes of data used by an application. These attributes include data types (e.g., characters, floating point, integer, Boolean, custom developed data structures, and the like), data lengths (e.g., fixed or varying), acceptable values for data fields, acceptable value ranges for data fields, data character sets, policies or rules to enforce on data field values, and others. Conventionally, normalization of data for heterogeneous applications has been focused on mapping disparate data field names. For example, a database field named "First Name" for one database is mapped to another database field named "Fname" for another database. However, this type of normalization is really just mapping and fails to account for disparate data field names that may be associated with heterogeneous applications. Thus, as one of ordinary skill in the art readily appreciates, conventional techniques provide techniques that allow data values to be imported and exported between heterogeneous applications, but conventional techniques lack the ability to normalize data characteristics between the heterogeneous applications.

Moreover, as used herein, the term application includes systems that can include a plurality of applications interfaced with or processing in the systems (e.g., operating system environments and the like). Furthermore, the phrase heterogeneous applications are applications that may or may not perform the same or similar functionality. For example, an Outlook email application is heterogeneous to a Lotus Notes email application. Likewise, an email application is heterogeneous (from certain functional standpoint) from a resource management application (e.g., PeopleSoft and others). Thus, heterogeneous applications include any two or more applications that are not native to the same application system.

Furthermore, in one embodiment, the present disclosure is implemented using DirXML product offering, distributed by Novell, Inc., of Provo Utah. Moreover, various embodiments utilize eDirectory and NetWare, both distributed by Novell, Inc., of Provo, Utah. Of course the techniques of various embodiments of the present disclosure can be implemented within a variety of existing or custom-developed applications or systems. Additionally, the embodiments of the present invention are not intended to be limited to any particular network. Thus, any hardwired, direct or indirect, or wireless network can be used with the tenets of the present disclosure.

FIG. 1 illustrates a flowchart representing one method 100 to normalize data characteristics between applications, according to one embodiment of the present invention. The method 100 is implemented in a computer accessible medium over a network. The applications are heterogeneous to one another. The applications are accessible over the network to one or more users and are managed by a network administrator. The method 100 is implemented as one or more applications or scripts that are interjected in the network, such that when access is attempted to the applications method 100 is automatically processed unbeknownst to the user of the applications. Thus, in some embodiments, method 100 can be viewed as a wrapper around the applications, but modifications to the applications are not required for method 100 to process.

At 110, a first application and a second application are identified. These applications can be identified in a variety of ways, such as by name, by pointer, and others. In one embodiment, an administrator uses a tool to provide to method 100 two or more applications or systems that are to be connected or interfaced; the tool can be integrated with existing network tools or can be a stand alone custom developed tool. As previously presented applications can include systems having or processing a plurality of applications.

Moreover, in one embodiment the first application is a first operating system and the second application is a disparate operating system. In still further embodiments, the first application is a first email application and the second application is a disparate email application. Of course one of ordinary skill in the art appreciates, that the first and second application can be any existing or future developed application or system, all of which are intended to fall within the broad scope of the present disclosure.

Once the first and second applications (or systems) are identified, at 120, a first data characteristic associated with the first application and a second data characteristic associated with the second application are identified. In one embodiment, at 122 the first data characteristic and/or the second data characteristic are automatically resolved by evaluating meta data associated with the first and second applications. For example, table definitions associated with disparate database tables can be read as schemas and examined to determine the attributes, data types, data lengths, and acceptable data values or ranges of values for each of the applications. In other embodiments, an administrator uses a tool to define the first data characteristic and/or second data characteristic, as depicted at 124. Data characteristics can also be naming policies, security policies, and others that are to be enforced by the applications.

When both the first and second data characteristics are identified, at 130, a determination is made to identify from the first and second data characteristic the most restrictive data characteristic. A most restrictive data characteristic (or a commonly enforceable data characteristic) is one that is minimally required by one of the applications and can be applied to the remaining application, even though the remaining application may permit a more relaxed data characteristic.

For example, a first application Windows NT (e.g., Operation System) may require a password having a minimal length of 6 bytes, while a second application for PeopleSoft (e.g., management system) may require a password having a minimal length of 8 bytes. In this example, Windows NT can accept passwords having a length of 8 bytes, but PeopleSoft cannot accept passwords having a length of 6 bytes. Therefore, the most restrictive (or common) data characteristic for password data length is determined to be passwords having a minimal length of 8 bytes. Thus, at 130, a commonly enforceable data characteristic between the first and second data characteristics is determined.

In some embodiments, it may be that the two applications have data characteristics where a most restrictive (or common) data characteristic cannot be applied to one of the applications. For example, one application may use a Personal Identification Number (PIN) as a password and require a four-digit number, but the remaining application requires a password having a minimal length of 6 bytes. In these circumstances, the conflict is identified at 132 and an administrator is notified at 134 of the data characteristics conflict between the two applications.

Furthermore, in some embodiments a most restrictive (or common) characteristic may be applied, such that the change affects a local user. For example, if a password that was previously allowed to be 6 characters in length is now set as a minimum of 8 characters in length, then an affected local user can be notified that passwords of 8 or more characters must now be supplied in order to gain access. In this way, when a common data characteristic is applied affected users can be automatically notified when the common data characteristic affects what the users would typically expect to be acceptable.

Upon detecting a conflict, at 136, the administrator (or different types of administrators) can use a tool to update or modify one of the applications or update the most restrictive (or common) data characteristic to override 130 or to adjust one of the applications to be compatible with data characteristics of the remaining application. Therefore, the administrator(s) is/are capable of interfacing with 130 and making needed adjustments. In some cases, this may require an administrator to log into an administrative tool for one of the applications and adjust data characteristics. In other cases, a complete update from a vendor of one of the applications may be required to obtain compatibility. In still other instances, the administrator can disable a piece of or the overall normalization process.

If there is not a data characteristic conflict, then, at 140, a normalized policy is issued that enforces the most restrictive (or common) data characteristic for both of the applications. Thus, when a user attempts to access one of the applications the most restrictive (or common) data characteristic will be automatically enforced before the user is granted access. In some cases, this most restrictive (or common) data characteristic relates to password security or other user validation techniques, such as when the applications are different networking systems (e.g., Windows NT, Netware, and the like). In other embodiments, the most restrictive data (or common) characteristic relates to other policies (e.g., naming conventions, and others) associated with the applications. Of course as one of ordinary skill in the art appreciates, a variety of other data characteristics can be represented within the issued policy and all such characteristics and policies are intended to fall within the broad scope of the present disclosure.

At 142, the issued policy is represented within a meta schema data structure. The meta schema data structure defines both syntactic and semantic (e.g., logic) rules associated with the policy and can be readily enforced or dynamically modified. A parsing and consuming script or application reads the meta schema and follows its defined rules. Thus, changes can be made to the meta schema without requiring a change in the consuming script or application, since the consuming script or application dynamically uses the content of the meta schema to drive its logic. Schema building tools (e.g., eDirectory, and others) and schema data format languages (e.g., Extensible Markup Language (XML), and others) are readily available to one of ordinary skill in the art.

In fact, in some embodiments, each application or system can have its own independent schema defining the data characteristics for it. In these embodiments, the two independent schemas can be compared and used to generate the meta schema, which can then be enforced as policy on both independent applications/systems. Thus, the single meta schema might be used to replace a plurality of disparate schemas this will result in easier maintenance, support, and upgrades to the network being administered and reduce the resource requirements of an organization.

The normalization of the data characteristics can be more complex as well, such as when one application requires a specific password hint, such as mother's maiden name, while the remaining application permits any password hint defined by a user. In these circumstances, the most restrictive (or common) data characteristic can be defined such that both systems are required to have a password hint with mother's maiden name.

One of ordinary skill in the art now appreciates how heterogeneous applications or systems can be integrated and managed with normalized data characteristics. This normalization permits easier network management of applications including improved support, maintenance, and upgrades. Furthermore, the normalization techniques of the embodiments of the present invention permit improved interoperability between applications within the network. In contrast, traditional techniques have not addressed normalization of data characteristics and are not capable of providing the benefits of the present disclosure.

Figure 2:
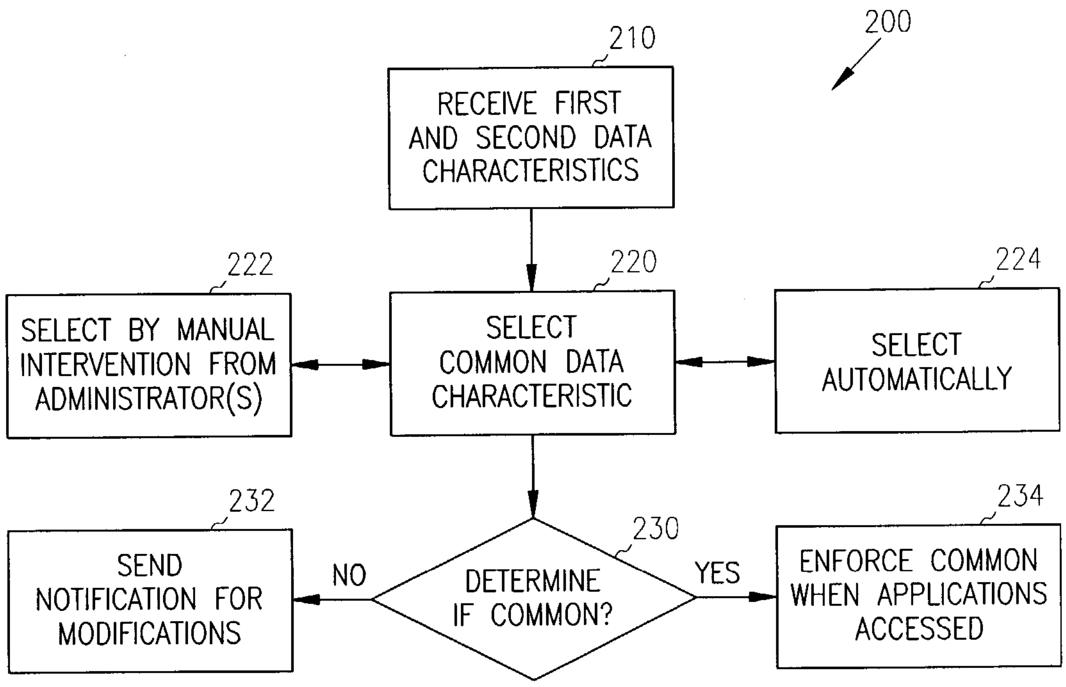
FIG. 2 is a flowchart representing another method to normalize data characteristics between applications, according to one embodiment of the present invention.

FIG. 2 illustrates a flowchart representing another method 200 to normalize data characteristics between applications, according to one embodiment of the present invention. Method 200 is implemented in a computer-readable medium as one or more applications or scripts. Furthermore, method 200 is interjected between various points of invocation and use of heterogeneous applications within a networked environment. Thus, method 200 can be processed upon an initial invocation of an application or it can be configurable to be processed at various desired processing states of the application.

At 210, a first data characteristic associated with a first application and a second data characteristic associated with a second application are received by method 200. In some embodiments, an administrator (or different types of administrators) uses tool to manually interface with method 200 in order to identify the first and second application. The applications are identified as being connected or related to the same network administrative policies defined by an organization. An administrator via a tool can manually supply the data characteristics, or alternatively the data characteristics can be automatically parsed and acquired from schemas or other meta data associated with the applications.

In one embodiment, the data characteristics are policies applied to the application or data of the application, such as password, other validation, naming, and/or other policies. In other embodiments, the data characteristics are attributes of data processed in the application, such as data types, lengths of data structures, acceptable values or ranges for data structures, and the like.

At 220, a common data characteristic is selected for both the first and second applications. Again, the common data characteristic can be manually provided or overridden by intervention from an administrator using a tool interfaced to method 200, as depicted at 222. In this way, an administrator can have control or adjust the common data characteristic as needed. In other embodiments, at 224, method 200 evaluates the schema or meta data associated with the first and second data characteristics in order to determine the common data characteristic. A common data characteristic is one that can be enforced against both the first and second applications.

If, at 230, a common data characteristic cannot be enforced or derived for both the first and second data characteristics, then, at 232, a notification for modification is sent to a network administrator. This notification can be tailored to be sent to specific types of administrators being affected. However, if at 230 a common data characteristic can be enforced against both the first and second data characteristics, then, at 234, the normalized common data characteristic is enforced against both applications when accessed. Enforcement can occur the first time a user invokes the first or second application, or the enforcement can occur during predefined and configured processing states associated with the first or second application.

By implementing embodiments of FIG. 2, one of ordinary skill in the art readily appreciates how a plurality of heterogeneous applications can be administered by a single meta policy or schema, by identifying and generating normalized common data characteristics that can be enforced uniformly for each of the heterogeneous applications. This can replace the management and administration of a plurality of disparate policies that require significant resources. Moreover, in some circumstances, the single meta policy or schema may be used to create greater interoperability among the heterogeneous applications.

Figure 3:
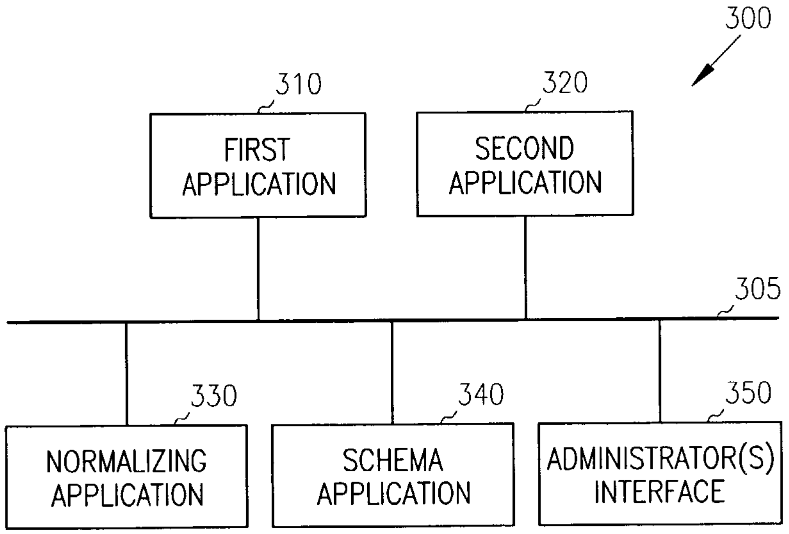
FIG. 3 is a diagram of a system to normalize data characteristics between applications, according to one embodiment of the present invention.

FIG. 3 illustrates a diagram of one system 300 to normalize data characteristics between applications, according to one embodiment of the present invention. The system includes a network 305, a first application 310, a second application 320, a normalization application 330, a schema application 340, and optionally one or more network administrator interfaces 350. The system 300 is implemented in a computer readable medium. The network 305 can be hardwired or wireless or a combination of hardwired and wireless interfaced together. The first application 310 may or may not be heterogeneous to the second application 320. Thus, data characteristics of the first application 310 are disparate from the second application 320. The applications 310 and 320 can also be systems having multiple applications processing therein.

The first application 310 includes a first data characteristic that includes policies or rules associated with the first application 310. In some embodiments, the first data characteristic also defines attributes of data (e.g., data types, data lengths, acceptable data values or ranges of values, and the like) used by the first application 310. In a similar manner, the second application 320 includes a second data characteristic that includes policies or rules associated with the second application 320. Moreover, in some embodiments, the second data characteristic defines attributes of data used by the second data application 320.

The data characteristics can be automatically acquired by parsing and processing meta data or schemas associated with the first and second applications 310 and 320. Alternatively, the data characteristics can be manually defined or supplied by a network administrator (or different types of administrators) using the administrator interface 350. In some embodiments, one of the data characteristics can be partially or completely resolved automatically, while the remaining data characteristic or part of a data characteristic is fully resolved by the administrator through interface 350.

Once the first application 310, the second application 320, the first data characteristic, and the second data characteristic are resolved, the normalization application 330 selects one of the two data characteristics as a common data characteristic. Again, the common data characteristic is one that can be enforced against both the first application 310 and the second application 320. In some embodiments, where schemas define the first and second applications 310 and 320, the common data characteristic can be represented as a meta schema that may be used to replace the previous disparate schemas. In other embodiments, where the first and second data characteristics were embodied in separate network administrative policies, the common data characteristic can be used to create a single policy for both the first and second applications 310 and 320.

The schema application 340 enforces the common data characteristic against the first and second applications 310 and 320 over the network 305. The schema application can be a wrapper or a script that reads and processes the common data characteristic when access is attempted to the first and second application 310 and 320. Alternatively, the schema application can be configured to enforce the common data characteristic during desired processing states of the first and second application 310 and 320.

In some circumstances a common data characteristic may not be enforceable by one of the applications 310 or 320. Under these circumstances, the normalization application 330 sends an alert to an administrator (or an appropriately affected administrator) for manual intervention. The manual intervention can require the administrator to use the interface 350 to override and define a common data characteristic that can be applied equally to the first and second applications 310 and 320. Alternatively, the manual intervention may cause the administrator to redefine configurable attributes associated with one of the applications 310 or 320 so that the common data characteristics can be equally applied to the first and second applications 310 and 320. Moreover, in some embodiments, the manual intervention may require one of the applications 310 or 320 to be upgraded to support a common data characteristic.

Moreover, in some embodiments, the first and second data characteristics are password rules associated with a first application 310 that is a first operating system and a second application 320 that is a second and disparate operating system. In other embodiments, the first and second data characteristics are field attributes or characteristics for a first application 310 that is a first database application and a second application 320 that is a second and disparate database application.

One of ordinary skill in the art now appreciates upon reading the above disclosure, how heterogeneous applications (or systems) can be administered or interfaced using a single normalized data characteristic representing a common data characteristic for the heterogeneous applications. The single common data characteristic permits multiple heterogeneous applications to be managed and administered over a network 350 with a single schema. Conversely, multiple schemas and/or policies are conventionally required to be managed and administered for heterogeneous applications.

Figure 4:
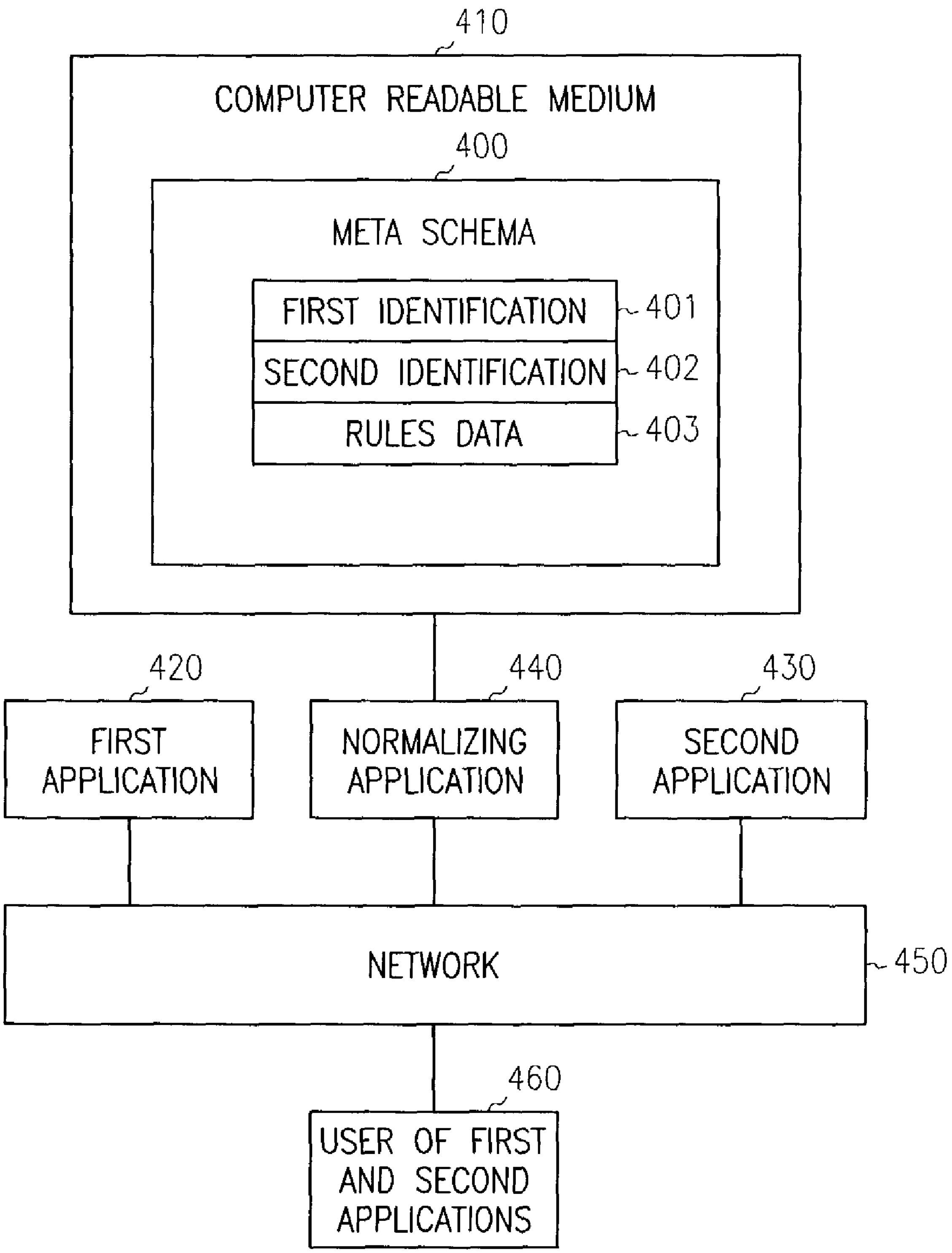
FIG. 4 is a diagram of a meta schema data structure for normalizing data characteristics between applications, according to one embodiment of the present invention.

FIG. 4 illustrates a diagram of one meta schema data structure 400 for normalizing data characteristics between applications, according to one embodiment of the present invention. The meta schema 400 includes a first identification 401, a second identification 402, and rules data 403. The meta schema 400 resides in a computer readable medium 410 or is logically assembled from a plurality of computer readable media 410 locations.

The first identification 401 is a pointer or reference to a first application 420 and the second identification 402 is a pointer or reference to a second application 430. The applications 420 and 430 are heterogeneous to one another, which indicates that different data characteristics are associated or enforced against the first application 420 from the second application 430. The meta schema 400, the first application 420, and the second application 430 are accessible over a network 450.

The rules data 403 defines a common data characteristic for accessing the first application 420 and the second application 430. The common data characteristic is a policy, rule, or data attribute that can be applied or enforced against both the first application 420 and the second application 430. Thus, the common data characteristic can be used to enforce common data policies, common data types, common data values, common data ranges, common data lengths, common character sets, and other common constraints against the first application 420 and the second application 430.

In some embodiments, the meta schema 400 is partially or wholly automatically constructed by a normalization application 440 that examines schemas for the first application 420 and the second application 430. In other embodiments, an administrator uses a tool to partially or wholly define and assign the meta schema 400 to the first application 420 and the second application 430.

Once the rules data 403 is defined and associated with the first application 420 and the second application 430, when a user 460 attempts to access the first application 420 or the second application 430 over the network 450 the meta schema 400 is invoked and the rules data 403 processed. Thus, access to both the first application 420 and the second application 430 is controlled and managed by the single meta schema 400 having the common data characteristic represented in the rules data 403.

The rules data 403 can be enforced when a user 460 makes a first and initial access attempt to one of the applications 420 or 430, or the rules data 403 can be configured to force enforcement during defined processing states associated with one of the applications 420 or 430.

Although, various embodiments of the present disclosure have been discussed with reference to a first and second application, it is readily apparent that more than two applications can use the teachings presented herein to create normalized data characteristics for the applications. A normalized common data characteristic permits uniform policy enforcement across heterogeneous applications within a network environment. This minimizes the support and maintenance required for administering a network within an organization and makes network upgrades easier to achieve. Furthermore, in some embodiments, the normalized enforcement a data characteristic can be used to permit improved interoperability between heterogeneous applications.

The foregoing description of various embodiments of the invention has been presented for purposes of illustration and description. It is not intended to be exhaustive or to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A method to normalize data characteristics between applications implemented in a computer-readable medium and to process on a computer for performing the method, comprising:

identifying a first application having first data characteristic and a second application having second data characteristic, the first and second data characteristic automatically parsed from metadata associated with the first and second applications, the first and second applications perform different functions from one another are each associated with a different application system and each application is associated with a different networking system from the other application, and the first and second data characteristics are at least associated with different data types from one another and the first and second data characteristics associated with different naming conventions for one another;

determining from the first data characteristic and the second data characteristic a most restrictive data characteristic, and the most restrictive data characteristic is one that is required by the first application and the most restrictive data characteristic is also accepted and applied by the second application when the second application permits a less restrictive data characteristic and the second application does not initially require the most restrictive data characteristic, and the most restrictive data characteristic is associated with password security, and the most restrictive data characteristic automatically resolved by evaluating the first and second data characteristics; and issuing a policy for accessing the first and second applications, the policy enforces the most restrictive data characteristic when accessing both the first and second applications, and the policy is enforced against a user when the user attempts to access the first and second application with the first or second data characteristic ensuring that the access uses the most restrictive data characteristic before access is granted to the user, and the most restrictive data characteristic defines attributes for data used by the first and second applications, the attributes include data types, data lengths, acceptable values for data fields, data character sets, acceptable value ranges for the data fields, and data character sets for the data, and the policy defines syntactic and semantic logic for enforcement and dynamic modification.

2. The method of claim 1 further comprising determining that a most restrictive data characteristic is in conflict with at least one of the first and second data characteristic.

3. The method of claim 1 wherein in identifying, the first and second data characteristics are at least one of attributes of disparate database tables, and policies or rules associated with the first and second applications.

4. The method of claim 1 wherein in issuing the policy, the policy is represented as a meta schema that is enforced across both the first and second applications.

5. The method of claim 1 wherein in issuing the policy, the policy is a set of rules for enforcing password validation across both the first and second applications.

6. The method of claim 5 wherein in issuing the policy, the first and second applications are disparate applications.

7. A method to normalize data characteristics between applications implemented in a computer-readable medium and to process on a computer for performing the method, comprising:

receiving a first data characteristic and a second data characteristic associated with a first application and a second application, respectively, and the first and second applications perform different functions from one another are each associated with a different application system and the first and second data characteristic are at least associated with different data types from one another, and the first and second data characteristics associated with different naming conventions for one another, also the first and second data characteristic are automatically parsed from metadata associated with the first and second applications;

selecting a common data characteristic for the first and second data characteristics, and the common data characteristic is one that is minimally required by the first application and one that can be applied by the second application even though the second application does not initially require common data characteristic and even though the second application permits a more relaxed data characteristic;

evaluating the first and second data characteristics to determine the common data characteristic; and determining that the common data characteristic can be enforced against both the first and second applications and enforcing the common data characteristic at predefined and configured processing states associated with the first and second applications, and the common data characteristic is used to ensure that access to the first and second application by a user complies with the common data characteristic, and the common data characteristic defines attributes for data used by the first and second applications, the attributes include data types, data lengths, acceptable values for data fields, data character sets, acceptable value ranges for the data fields, and data character sets for the data.

8. The method of claim 7 wherein in receiving, the first and second data characteristics are policies or rules applied by the first and second applications.

9. The method of claim 7 wherein in receiving, the first and second applications are network administered and accessible over a network.

* * * * *